United States Patent [19]

Lin et al.

[11] Patent Number: 4,921,919

[45] Date of Patent: May 1, 1990

[54] METHOD AND APPARATUS FOR MINIMIZING POLYMER AGGLOMERATE OR LUMP FORMATION IN A GAS-PHASE POLYPROPYLENE POLYMERIZATION REACTOR

[75] Inventors: Chi-Hung Lin, Wheaton; Jack F. Stevens, Naperville; Benjamin S. Tovrog, Naperville; Philip M. Rose, Naperville, all of Ill.

[73] Assignee: Amoco Corporation, Chicago, Ill.

[21] Appl. No.: 202,092

[22] Filed: Jun. 3, 1988

Related U.S. Application Data

[63] Continuation-in-part of Ser. No. 807,265 Dec. 10, 1985, now abandoned.

[51] Int. Cl.$^5$ ................................. C08F 2/34
[52] U.S. Cl. .................................... 526/88; 526/901; 526/919; 422/131
[58] Field of Search ..................................... 526/88

[56] References Cited

U.S. PATENT DOCUMENTS

| | | | |
|---|---|---|---|
| 2,993,036 | 7/1961 | Thomka et al. | 526/88 |
| 3,652,527 | 3/1972 | Trieschmann et al. | 526/88 |
| 3,957,448 | 5/1976 | Shepard et al. | 526/65 |
| 4,130,699 | 12/1978 | Hoff et al. | 526/88 |
| 4,535,134 | 8/1985 | de Lorenzo et al. | 526/88 |
| 4,665,143 | 5/1987 | Ahluwalia et al. | 526/901 |

Primary Examiner—Edward J. Smith
Attorney, Agent, or Firm—Wallace L. Oliver; William H. Magidson; Ralph C. Medhurst

[57] ABSTRACT

The process and the system are used for carrying out the quench-cooled, vapor-phase polymerization of olefin monomer in a horizontally disposed reactor vessel which comprises contacting olefin monomer, or a mixture of olefin monomers, with a polymerization catalyst system in the presence of hydrogen in the reactor vessel to form a polymer product. The improvement comprises introducing a titanium-containing catalyst component of the catalyst system into the top side of the reactor vessel at a point adjacent to the upstream end of the reactor vessel and introducing a cocatalyst plus modifer component of the catalyst system into the top side of the reactor vessel at a distance, downstream of the point of introduction of the titanium-containing catalyst component, which is equal to 25% of the inside diameter of the reactor vessel.

3 Claims, 1 Drawing Sheet

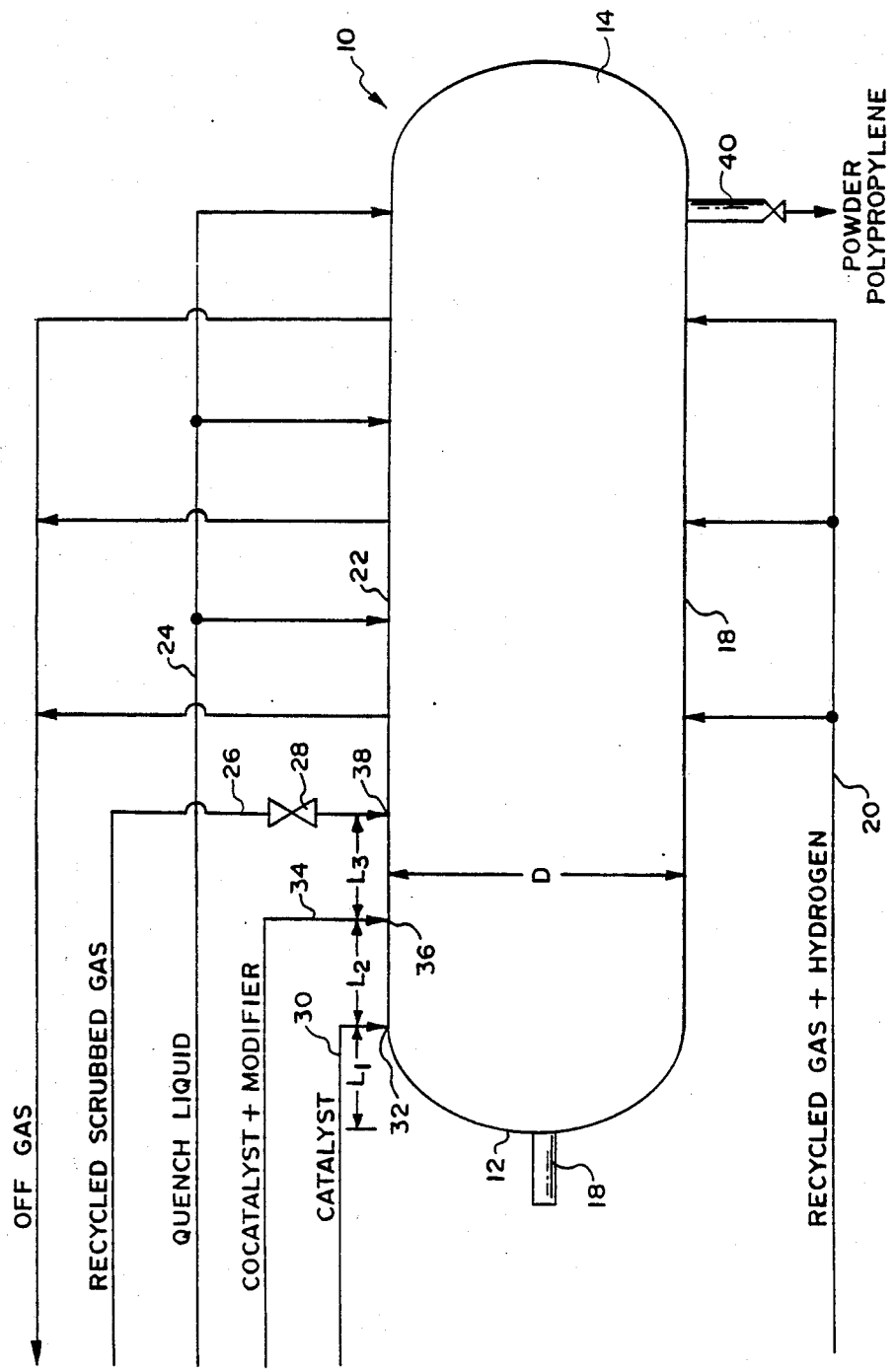

METHOD AND APPARATUS FOR MINIMIZING POLYMER AGGLOMERATE OR LUMP FORMATION IN A GAS-PHASE POLYPROPYLENE POLYMERIZATION REACTOR

This is a continuation of application Ser. No. 807,265, filed Dec. 10, 1985, now abandoned.

BACKGROUND OF THE INVENTION

1. Field of the Invention

The present invention relates to a process for vapor-phase polymerization of monomers in a vapor-phase, quench-cooled reactor vessel in which off-gas from the reactor vessel is recycled. More specifically, this invention relates to a method and apparatus for minimizing the formation of polymer agglomerates or lumps in a reactor used in the gas-phase polymerization of polypropylene by controlling the location of injection of a catalyst into the reactor on one hand and a cocatalyst and modifier into the reactor on the other hand while maintaining catalyst yield and stereospecificity as well as polymer physical properties.

2. Description of the Prior Art

Vapor-phase polymerization processes using vapor-phase, quench-cooled reactor vessels have been described in a number of U.S. patents including: U.S. Pat. Nos. 3,957,448, 3,965,083, 3,971,768, 4,101,289 and 4,372,919, all incorporated by reference herein. These references describe polymerization processes and apparatus in which polymer is formed from gaseous monomer in horizontal stirred bed vessels.

Typically, in operation of such processes and apparatus, particles of polymer are formed around solid catalyst particles.

The horizontally disposed reactor vessel typically has recycled propylene gas introduced into the bottom thereof together with hydrogen gas. Then, liquid propylene, as a quench liquid, is injected into the reactor from the top of the reactor. The hydrogen is provided for molecular weight control.

Paddlewheels or other types of agitators inside the vessel stir the contents of the vessel.

At a so-called upstream end of the vessel a catalyst system comprising a catalyst injected at one point into the top of the vessel, and a cocatalyst plus modifier injected at a point adjacent the point of injection of the catalyst, is injected into the top of the vessel.

Solid polypropylene powder is created in the vessel and is withdrawn from the downstream end thereof.

It is desirable to create polymer particles as quickly as possible, and for this purpose a number of different high activity catalyst systems have been developed.

However, one of the problems that has been incurred with such vapor-phase polymerization processes and apparatus using a vapor-phase, quench-cooled horizontally disposed reactor vessel is the formation of lumps in the powder polymer products within the reactor vessel and in the powder polymer product.

Lumps in the product result in a nonuniform size product and lumps inside the reactor vessel can result in stoppage of the process requiring cleaning of the reactor vessel before the process can be continued. This can be quite costly and time consuming.

As will be described in greater detail hereinafter, the method and apparatus of the present invention minimize the formation of polymer agglomerates or lumps. Such minimization of polymer agglomerates or lumps has been brought about by the discovery that if the catalyst is introduced into the reactor vessel adjacent to the upstream end of the reactor vessel and then the cocatalyst plus modifier are introduced into the reactor vessel at a sufficient distance downstream from the point of introduction of the catalyst, formation of polymer agglomerates or lumps is minimized, if not altogether avoided.

Although not known with absolute certainty, it is believed that separating the introduction of the catalyst and cocatalyst plus modifier facilitates the gradual activation of the catalyst by thorough mixing of the catalyst with the polymer material within the reactor vessel prior to the interaction of a high concentration of the cocatalyst plus modifier with the polymer material and catalyst resulting in a reduction, if not altogether avoidance, of the formation of polymer lumps within the reactor vessel.

SUMMARY OF THE INVENTION

According to the invention, there is provided in a process for quench-cooled, vapor-phase polymerization of olefin monomer in a horizontally disposed reactor vessel comprising contacting olefin monomer, or a mixture of olefin monomers, with a polymerization catalyst system in the presence of hydrogen in a reactor vessel to form a polymer product, the improvement comprising introducing a titanium-containing catalyst component of the catalyst system into the top side of the reactor vessel adjacent to the upstream end of the reactor vessel and introducing a cocatalyst plus modifier component of the catalyst system into the top side of the reactor vessel at a distance downstream of the point of introduction of the titanium-containing catalyst component, the downstream distance being equal to at least 25% of the inside diameter of the reactor vessel.

Further according to the invention, there is provided a system for quench-cooled, vapor-phase polymerization of olefin monomer in a horizontally disposed reactor vessel comprising means for contacting olefin monomer, or a mixture of olefin monomers, with a polymerization catalyst system in the presence of hydrogen in a reactor vessel to form a polymer product, the improvement comprising means for introducing a catalyst component of the catalyst system into the top side of the reactor vessel located at a point as close as practical to the upstream end of the reactor vessel and means for introducing a cocatalyst plus modifier component of the catalyst system into the reactor vessel located at a distance downstream of the means for introduction of the catalyst component, the distance downstream being equal to at least 25% of the inside diameter of the reactor vessel.

BRIEF DESCRIPTION OF THE DRAWINGS

FIG. 1, the only figure of the drawings, is a side view of a quench-cooled, vapor-phase olefin polymerization reactor vessel constructed according to the teachings of the present invention.

DESCRIPTION OF THE PREFERRED EMBODIMENT

Referring now to the drawings in greater detail, there is illustrated in FIG. 1 a reactor vessel 10 which is utilized in a vapor-phase polymerization process and apparatus of the type in the processes disclosed in the U.S.

patents cited above such as, for example, U.S. Pat. No. 3,965,083.

Such reactor vessel 10 is elongate, having an upstream end 12 and a downstream end 14 and is disposed in a generally horizontal position as shown in FIG. 1.

A shaft 18 extends into the upstream end 14 of the reactor vessel 10 and has mounted thereon paddlewheels, or other type of agitators (not shown and hidden from view) within the reactor vessel 10. These paddlewheels, or agitators (not shown) mix the polymer material such as polypropylene, within the reactor vessel with other materials introduced into the reactor vessel 10.

As shown, a recycled gas, such as propylene, plus hydrogen, is introduced into the horizontally disposed bottom side 18 of the reactor vessel 10 via input line 20.

Then, introduced into the horizontally disposed top side 22 of the cylindrical reactor vessel 10 is a quench liquid, such as liquid propylene, via an input line 24. Also, into the top side 22 of the horizontally disposed cylindrical reactor vessel 10, recycled scrubbed gas via an input line 26 and a valve 28 may be introduced.

According to the teachings of the present invention, a catalyst component such as a supported high activity heterogeneous solid catalyst, e.g. a titanium chloride supported on a magnesium compound, is introduced via an input line 30 at a point 32 which is close to the upstream end 12 of the reactor vessel 10. This distance from the upstream end 12 is indicated as $L_1$ in FIG. 1.

Then, a cocatalyst plus modifier component of the catalyst system is introduced via an input line 34 at a point 36 on the top side 22 of the cylindrical reactor vessel 10 which is downstream from the point 32 and is a predetermined critical distance identified as $L_2$ from the point 32. Typically, the distance $L_2$ will be a function of the inner diameter D of the reactor vessel 20.

Titanium-containing components useful in this invention generally are supported on hydrocarbon-insoluble, magnesium-containing compounds in combination with an electron donor compound. Such supported titanium-containing olefin polymerization catalyst component typically is formed by reacting a titanium(IV) halide, an organic electron donor compound, and a magnesium-containing compound. Optionally, such supported titanium-containing reaction product may be further treated or modified by comminution or further chemical treatment with additional electron donor or Lewis acid species.

Although the chemical structure of the titanium halide-based, magnesium-containing catalyst components described herein is not presently known, the components preferably contain from about 1 to about 6 wt % titanium, from about 10 to about 25 wt % magnesium, and from about 45 to about 65 wt % halogen. Preferred catalyst components made according to this invention contain from about 1 to about 2 wt % titanium, from about 15 to about 21 wt % magnesium, and from about 55 to about 65 wt % chlorine.

The supported titanium-containing catalyst component used in this invention is used in a polymerization catalyst system containing a co-catalyst component including a Group II or III metal alkyl and, typically, one or more modifier compounds.

Useful Group II and IIIA metal alkyls are compounds of the formula $MR_m$ where M is a Group II or IIIA metal, each R is independently an alkyl radical of 1 to about 20 carbon atoms and m corresponds to the valence of M. Examples of useful metals, M, include magnesium, calcium, cadmium, aluminum, and gallium. Examples of suitable alkyl radicals, R, include methyl, ethyl, butyl, hexyl, decyl, tetradecyl, and eicosyl.

From the standpoint of catalyst component performance, preferred Group II and IIIA metal alkyls are those of magnesium, zinc and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_{12}H_{25})_2$, $Al(CH_3)_3$, $Al(C_2H_5)_3$, $Al(C_3H_7)_3$, $Al(C_4H_9)_3$, $Al(C_6H_{13})_3$ and $Al(C_{12}H_{25})_3$. More preferably a magnesium, zinc or aluminum alkyl containing 1 to about 6 carbon atoms per alkyl radical is used. Best results are achieved through the use of trialkylaluminums containing 1 to about 6 carbons per alkyl radical, and particularly triethylaluminum and triisobutylaluminum or a combination thereof.

If desired, metal alkyls having one or more halogen or hydride groups can be employed, such as ethylaluminum dichloride, diethylaluminum chloride, ethylaluminum sesquichloride, diisobutylaluminum hydride, and the like.

Cocatalyst modifiers which may be useful in polymerization include silanes, mineral acids, organometallic chalcogenide derivatives of hydrogen sulfide, organic acids, organic acid esters and mixtures thereof.

Organic electron donors useful as cocatalyst modifiers useful in this invention are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors can be employed if desired.

Preferred organic acids and esters are benzoic acid, halobenzoic acid, phthalic acid, isophthalic acid, terephthalic acid and the alkyl esters thereof wherein the alkyl group contains 1 to about 6 carbon atoms such as methyl benzoate, methyl bromobenzoate, ethyl benzoate, ethyl chlorobenzoate, butyl benzoate, isobutyl benzoate, ethyl chlorobenzoates, butyl benzoate, isobutyl benzoate, methyl anisate, ethyl anisate, methyl p-toluate, hexyl benzoate, cyclohexyl benzoate, and diisobutyl phthalate as these give good results in terms of activity and stereospecificity and are convenient to use.

The above described catalysts of this invention are useful in polymerization of alpha-olefins such as ethylene and propylene and are most useful in stereospecific polymerization of alpha-olefins containing 3 or more carbon atoms such as propylene, butene-1, pentene-1, 4-methylpentene-1, and hexene-1, as well as mixtures thereof with ethylene. The invented catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalpha-olefins are prepared by contacting at least one alpha-olefin with the above described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry-, bulk- and vapor-phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter. Typically, catalysts of this invention are used in amounts ranging from about 0.2 to 0.05 milligrams of catalyst to gram of polymer produced.

Irrespective of the polymerization process employed, polymerization should be carried out at temperatures sufficiently high to ensure reasonable polymerization rates and avoid unduly long reactor residence times. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 90° C.

Alpha-olefin polymerization according to this invention is carried out at monomer pressures of about atmospheric or above. Generally monomer pressures range from about 20 to about 600 psi, although in vapor-phase polymerization, monomer pressures should not be below the vapor pressure at the polymerization temperature of the alpha-olefin to be polymerized.

Recycled scrubbed gas may be introduced into the top side 22 of the cylindrical horizontally disposed reactor vessel 10 at a point 38 which is downstream from the point 36 by a distance $L_3$.

Powder polymer product is then withdrawn via an outlet 40 adjacent the downstream end 14 of the reactor vessel as shown. Typically, such polymer product is powder polypropylene.

In accordance with the teachings of the present invention, the distance $L_2$ between the point of introduction of the catalyst component 32 and the point of the introduction of the cocatalyst plus modifier component 36 downstream from the point 32 of introduction of the catalyst is equal to at least 25% of the diameter D of the reactor vessel.

With this arrangement of the points of introduction of the catalyst and cocatalyst plus modifier, the catalyst is allowed to mix with the polymer material within the reactor vessel 10 and the point in time of catalyst reaction with the cocatalyst plus modifier is postponed or delayed. The catalyst is gradually activated as it is mixed with the polymer thus reducing the sudden polymerization and polymer lump formation when catalyst and cocatalyst plus modifier are introduced into the the reactor adjacent to each other.

Empirical tests have shown that the greater the distance $L_2$, the fewer the polymer lumps created within the reactor vessel 10 and the fewer the lumps found in the powder polymer product withdrawn from the outlet 40.

However, it will be appreciated that the creation of polymer product within the vessel and the length of the reactor vessel create limitations on the distance $L_2$. In this respect, if the cocatalyst plus modifier were introduced adjacent the downstream end 14 of the reactor vessel 10, the extensive delay in catalyst activation would result in poor utilization of the reactor volume in order to create polymer product which is withdrawn from the outlet 40.

Empirical tests conducted with the distance $L_2$ being varied between 17% and 130% of the internal diameter D of the reactor vessel indicate that a preferred distance as a percentage of the internal diameter of the reactor vessel is between 30 and 80% of the internal diameter D of the reactor vessel.

Set forth below are the operating parameters of several empirical tests or examples conducted with various lengths $L_2$.

EXAMPLE I

In this example, a reactor vessel 10 of the type utilized in the process disclosed in U.S. Pat. No. 3,965,083 was used.

| Parameter | Parameter Value |
|---|---|
| Test Length | 8 hours |
| Reactor Temperature °F. | 160 |
| Reactor Pressure, psig | 300 |
| Catalyst | A titanium-containing high activity heterogeneous solid catalyst supported on a magnesium compound |
| $L_2$, Distance Between Nozzles as % of Internal Diameter D | 19 |
| Polymer Lumps, % of Production Rate | 0.4–2.25 |

EXAMPLE II

| Parameter | Parameter Value |
|---|---|
| Test Length | 7 days |
| Reactor Temperature, °F. | 160 |
| Reactor Pressure, psig | 300 |
| Catalyst | A titanium-containing high activity heterogeneous solid catalyst supported on a magnesium compound |
| $L_2$, Distance Between Nozzles as % of Internal Diameter D | 130 |
| Polymer Lumps, % of Production Rate | 0.01–0.07 |

EXAMPLE III

In another test, polypropylene was polymerized in a continuous reactor vessel 10 having an internal diameter of 16¼ inches and a length of approximately 48¼ inches. The powder bed within the reactor vessel occupied approximately 40% of the reactor vessel volume. The catalyst was the same as used in Examples I and II and the polymerization was carried out at 160° F. and 300 psig pressure and the agitator was operated at a speed of 45 rpm. The catalyst/hexane slurry (in a concentration of 0.0326 g/cc) was stored in a 2 gallon autoclave vessel and was injected into the reactor vessel 10 in an intermittent fashion through a ⅛ inch tubing of 10 feet in length. During the polymerization, the catalyst and the cocatalyst/modifier injections were operated with the catalyst injection nozzle located downstream of the cocatalyst/modifier injection nozzle. The other parameters and the polymer lump formation resulting therefrom are as follows:

| Parameter | Parameter Value |
| --- | --- |
| Distance Between Nozzles, inches | 2¾ |
| Distance as % of Internal Diameter | 17 |
| Polymer Lumps as % of Powder Produced | 0.21 |

EXAMPLE IV

In the fourth example utilizing the basic parameters provided in Example III, but with the catalyst injection nozzle located upstream of the cocatalyst/modifier nozzle, the operating parameters were as follows:

| Parameter | Parameter Value |
| --- | --- |
| Distance Between Nozzles, inches | 6¾ |
| Distance as % of Internal Diameter | 42 |
| Polymer Lumps as % of Powder Produced | 0.016 |

It will be understood that the formation of polymer lumps in a gas-phase polymerization, horizontally disposed cylindrical reactor, e.g. reactor 10, when a high activity catalyst and cocatalyst system is used, is not desirable since known operational difficulties result in the reactor 10 in the downstream equipment. The lumps also represent polymer and catalyst material losses. Also, severe polymer lump formation can cause costly down time (stoppage of the operation of the reactor vessel 10) at a production unit. Accordingly, prevention, or at least minimization, of polymer lump production is essential in the utilization of the high activity catalyst system.

The present invention overcomes and solves this problem of lump formation by the discovery that locating the injection of the cocatalyst plus modifier component at a distance equal to at least 25% of the internal diameter of the reactor downstream from the point of injection of the catalyst component into the reactor vessel greatly reduces the formation of polymer lumps. Also, it has been discovered according to the teachings of the present invention that such distance should be preferably between 30 and 80% of the internal diameter of the reactor vessel. Moreover, it is essential the catalyst be injected into the reactor 10 at a point upstream of the cocatalyst/modifier injection nozzle.

From the foregoing description, it will be understood that the method and apparatus of the present invention provide a number of advantages some of which have been described above and others of which are inherent in the invention. In particular, the critical spacing of the points of injection of the catalyst and cocatalyst plus modifier components into a horizontally disposed cylindrical reactor vessel minimize, if not altogether prevent, the creation of polymer lumps.

Also, it will be appreciated that modifications can be made to the method and apparatus of the present invention without departing from the teachings of the invention. Accordingly, the scope of the invention is only to be limited as necessitated by the accompanying claims.

We claim:

1. In a process for quench-cooled, vapor-phase polymerization of olefin monomer in a horizontally disposed reactor vessel comprising contacting olefin monomer, or a mixture of olefin monomers, with a polymerization catalyst system in the presence of hydrogen in a reactor vessel to form a polymer product, the improvement comprising introducing a high activity titanium-containing catalyst component of the catalyst system into the top side of the reactor vessel onto a polymer bed at a point as close as possible to the upstream end of the reactor vessel, mixing the catalyst component with the polymer product in the reactor vessel and introducing a cocatalyst plus modifier component of the catalyst system into the top side of the reactor vessel onto the polymer bed at a distance downstream of the point of introduction of the catalyst, the downstream distance being equal to at least 25% of the inside diameter of the reactor vessel.

2. The process of claim 1 wherein the downstream distance is equal to 30% of the inside diameter of the reactor vessel.

3. The process of claim 1 wherein the downstream distance is equal to 80% of the inside diameter of the reactor vessel.

* * * * *